(12) United States Patent
Minervini et al.

(10) Patent No.: US 8,265,794 B2
(45) Date of Patent: Sep. 11, 2012

(54) KNOWLEDGE BASED VALVE CONTROL METHOD

(75) Inventors: Leo Minervini, Saddle Brook, NJ (US); Daniel W. Mrozinski, Brewster, NY (US)

(73) Assignee: Westlock Controls Corporation, Saddle Brook, NJ (US)

( * ) Notice: Subject to any disclaimer, the term of this patent is extended or adjusted under 35 U.S.C. 154(b) by 277 days.

(21) Appl. No.: 12/236,680

(22) Filed: Sep. 24, 2008

(65) Prior Publication Data

US 2009/0088906 A1 Apr. 2, 2009

Related U.S. Application Data

(60) Provisional application No. 60/976,625, filed on Oct. 1, 2007.

(51) Int. Cl.
*G05D 7/00* (2006.01)
*G05D 11/00* (2006.01)
*G05B 21/00* (2006.01)
*G05B 13/00* (2006.01)
*F17D 3/00* (2006.01)
*G01F 1/00* (2006.01)
*G01F 7/00* (2006.01)

(52) U.S. Cl. .......... 700/282; 700/90; 700/275; 700/289; 137/2; 702/45

(58) Field of Classification Search .................. 700/90, 700/275, 289, 282; 137/2; 702/45
See application file for complete search history.

(56) References Cited

U.S. PATENT DOCUMENTS

| | | | | |
|---|---|---|---|---|
| 4,037,598 A * | 7/1977 | Georgi | ............................. | 604/65 |
| 4,417,312 A * | 11/1983 | Cronin et al. | .................. | 700/282 |
| 4,590,576 A * | 5/1986 | Elpiner | .......................... | 700/282 |
| 4,879,662 A * | 11/1989 | Vicari et al. | ................... | 700/282 |
| 4,896,101 A * | 1/1990 | Cobb | ........................... | 324/73.1 |
| 5,124,934 A * | 6/1992 | Kawamoto et al. | ............ | 700/282 |
| 5,142,483 A * | 8/1992 | Basham et al. | .................. | 702/47 |
| 5,518,015 A * | 5/1996 | Berget et al. | ....................... | 137/1 |
| 5,711,507 A * | 1/1998 | Berget et al. | ............. | 251/129.04 |
| 5,995,909 A * | 11/1999 | Bretmersky et al. | ............ | 702/50 |
| 6,047,220 A * | 4/2000 | Eryurek | .......................... | 700/28 |
| 6,260,004 B1 * | 7/2001 | Hays et al. | ..................... | 702/183 |
| 6,272,401 B1 * | 8/2001 | Boger et al. | ..................... | 700/282 |
| 6,356,811 B1 * | 3/2002 | Beselt | ............................ | 700/301 |
| 6,370,448 B1 * | 4/2002 | Eryurek | ........................ | 700/282 |
| 6,519,938 B1 * | 2/2003 | Foss | ................................ | 60/410 |
| 6,564,824 B2 * | 5/2003 | Lowery et al. | .............. | 137/487.5 |
| 6,564,825 B2 * | 5/2003 | Lowery et al. | .............. | 137/487.5 |
| 6,655,408 B2 * | 12/2003 | Linthorst | .................... | 137/487.5 |

(Continued)

OTHER PUBLICATIONS

Poley, R., "DSP Control of Electro-Hydraulic Servo Actuators", Jan. 2005, Texas Instruments, Application Report—SPRAA76.*

(Continued)

*Primary Examiner* — Mohammad Ali
*Assistant Examiner* — Kelvin Booker

(57) ABSTRACT

A method associated with a valve controller configured to capture dynamic process conditions for monitoring, diagnosing and maintaining a valve assembly through knowledge-based valve performance criteria. The method includes determining the open and closed positions of a process valve. Measuring the peak torque value required by an actuator to open and close the process valve. Measuring the supply and exhaust pressure required by an actuator to open and close the valve. Determining a deviation zone associated with the peak torque value to open the valve where an alarm is triggered when the torque value falls outside the deviation zone. Creating the dynamic baseline over $N^{th}$ process cycles when the valve is installed in-line.

20 Claims, 3 Drawing Sheets

U.S. PATENT DOCUMENTS

| | | | |
|---|---|---|---|
| 6,725,167 B2* | 4/2004 | Grumstrup et al. | 700/282 |
| 6,745,107 B1* | 6/2004 | Miller | 700/282 |
| 6,810,308 B2* | 10/2004 | Shajii et al. | 700/282 |
| 6,810,906 B2* | 11/2004 | Tanaka et al. | 700/282 |
| 6,820,631 B2* | 11/2004 | Lehnst et al. | 137/2 |
| 6,895,287 B2* | 5/2005 | Tanaka | 700/37 |
| 6,917,858 B2* | 7/2005 | Boger | 700/282 |
| 6,962,164 B2* | 11/2005 | Lull et al. | 137/2 |
| 6,973,375 B2* | 12/2005 | Brodeur et al. | 700/282 |
| 7,004,191 B2* | 2/2006 | Shajii et al. | 137/487.5 |
| 7,018,800 B2* | 3/2006 | Huisenga et al. | 435/6.11 |
| 7,069,944 B2* | 7/2006 | Morikawa et al. | 700/282 |
| 7,089,086 B2* | 8/2006 | Schoonover | 700/275 |
| 7,111,614 B1* | 9/2006 | Coldren et al. | 123/467 |
| 7,114,511 B2* | 10/2006 | Lull et al. | 137/1 |
| 7,231,931 B2* | 6/2007 | Lull et al. | 137/2 |
| 7,264,017 B2* | 9/2007 | Denike et al. | 137/495 |
| 7,272,512 B2* | 9/2007 | Wang et al. | 702/45 |
| 7,317,971 B2* | 1/2008 | Laverdiere et al. | 700/282 |
| 7,380,564 B2* | 6/2008 | Lull et al. | 137/1 |
| 7,403,826 B2* | 7/2008 | Aghili et al. | 700/28 |
| 7,512,460 B2* | 3/2009 | Strosser et al. | 700/282 |
| 7,539,560 B2* | 5/2009 | Boger et al. | 700/282 |
| 7,559,197 B2* | 7/2009 | Verkuilen | 60/429 |
| 7,720,574 B1* | 5/2010 | Roys | 700/282 |
| 7,740,024 B2* | 6/2010 | Brodeur et al. | 137/12 |
| 7,809,473 B2* | 10/2010 | Shajii et al. | 700/282 |
| 7,881,829 B2* | 2/2011 | Yoneda et al. | 700/282 |
| 7,890,216 B2* | 2/2011 | Boger et al. | 700/282 |
| 7,918,238 B2* | 4/2011 | Tanaka et al. | 137/10 |
| 7,925,385 B2* | 4/2011 | Stavale et al. | 700/282 |
| 7,925,386 B2* | 4/2011 | Krippner et al. | 700/282 |
| 7,940,189 B2* | 5/2011 | Brown | 340/621 |
| 7,945,414 B2* | 5/2011 | Nagase et al. | 702/114 |
| 8,015,995 B2* | 9/2011 | Brodeur et al. | 137/487.5 |
| 8,062,257 B2* | 11/2011 | Moberg et al. | 604/151 |
| 8,079,383 B2* | 12/2011 | Ding | 137/487.5 |
| 8,082,066 B2* | 12/2011 | Laverdiere et al. | 700/283 |
| 8,082,946 B2* | 12/2011 | Laverdiere et al. | 137/487.5 |
| 8,112,182 B2* | 2/2012 | Tokuhisa et al. | 700/282 |
| 8,150,553 B2* | 4/2012 | Shajii et al. | 700/282 |
| 2001/0035512 A1* | 11/2001 | Messer et al. | 700/282 |
| 2001/0037159 A1* | 11/2001 | Boger et al. | 700/52 |
| 2001/0037670 A1 | 11/2001 | Boger et al. | 700/114 |
| 2002/0198668 A1* | 12/2002 | Lull et al. | 702/45 |
| 2004/0204794 A1* | 10/2004 | Ohmi et al. | 700/282 |
| 2005/0059926 A1* | 3/2005 | Sage et al. | 604/65 |
| 2005/0182524 A1* | 8/2005 | Brodeur et al. | 700/282 |
| 2005/0182525 A1* | 8/2005 | Laverdiere et al. | 700/282 |
| 2006/0052904 A1* | 3/2006 | Brodeur et al. | 700/282 |
| 2006/0272710 A1 | 12/2006 | Minervini et al. | 137/487.5 |
| 2006/0276935 A1* | 12/2006 | Laverdiere et al. | 700/282 |
| 2007/0016333 A1* | 1/2007 | Edwards et al. | 700/282 |
| 2007/0068225 A1* | 3/2007 | Brown | 73/40.5 A |
| 2007/0225870 A1* | 9/2007 | Davidkovich et al. | 700/282 |
| 2007/0262029 A1* | 11/2007 | Yoshida et al. | 210/741 |
| 2008/0004836 A1* | 1/2008 | Tewes et al. | 702/182 |
| 2008/0009978 A1* | 1/2008 | Smirnov | 700/282 |
| 2008/0091306 A1* | 4/2008 | Shajii et al. | 700/282 |
| 2008/0140260 A1* | 6/2008 | Ding | 700/282 |
| 2008/0154436 A1* | 6/2008 | Krippner et al. | 700/282 |
| 2008/0264498 A1* | 10/2008 | Thompson et al. | 137/554 |
| 2008/0294293 A1* | 11/2008 | Yamamoto | 700/282 |
| 2009/0303057 A1* | 12/2009 | Brown | 340/605 |
| 2009/0312876 A1* | 12/2009 | Yoneda et al. | 700/282 |
| 2009/0326719 A1* | 12/2009 | Nagase et al. | 700/282 |
| 2010/0324743 A1* | 12/2010 | Shajii et al. | 700/282 |

OTHER PUBLICATIONS

Atmanand, M.A. and Konnur, M.S., "A Novel Method of Using a Control Valve for Measurement and Control of Flow", Dec. 1999, IEEE Transactions on Instrumentation and Measurement, vol. 48, No. 6.*

Wu, D., Burton, R., Schoenau, G. and Bitner, D., "Analysis of a Pressure-Compensated Flow Control Valve", Mar. 2007, Journal of Dynamic Systems, Measurement and Control, vol. 129.*

* cited by examiner

KNOWLEDGE BASED VALVE CONTROL METHOD

FIELD OF THE INVENTION

The present invention relates generally to valve controllers. More particularly, the present invention relates to a method associated with a valve controller configured to capture dynamic process conditions for monitoring, diagnosing and maintaining a valve assembly through knowledge-based valve performance criteria.

BACKGROUND OF THE INVENTION

A valve package is installed within a process line to control process flow in industrial applications such as oil and natural gas processing, food and beverage production, and chemical and pharmaceutical processing. Usually a valve package includes a process valve, actuator for opening/closing the valve and a controller configured to control the opening, closing and position of the valve. The valve controller may further have the capability to monitor valve operation and signal an error message if a failure condition occurs. The controller initiates the actuator to open or close the valve. A number of different types of actuators may be used to open/close particular types of valves. For example, a linear actuator may be used to open/close a diaphragm valve; a rotary actuator may be used to open/close a butterfly or ball valve.

Typically, the operation of a valve package is first tested on the bench (i.e. not installed within a process line) to ensure that the valve opens and closes based on signals supplied to the controller and the actuator is sized appropriately for the valve. A reference profile is developed based on this testing to determine how long it takes the valve to open/close and under what operating conditions (supply pressure, exhaust pressure, etc.). Because the valve package is first tested outside an actual process line, particular operating characteristics are not considered when determining these reference profiles. In addition, this out of line testing does not indicate if the valve and actuator are appropriate for a particular process application. For example, if the process flows in a high pressure environment, the actuator may require torque T1 to open and close the valve having size S1. In contrast, if the process flows under low pressure, the torque T2 required to open and close the valve having size S2 may each be lower than torque T1 and size S1. These profiles do not take into account the effects of process flow, environmental parameters (e.g. temperature) and general operating characteristics as the valve function in-line. Thus, there is a need to provide a dynamic method of capturing process conditions of a valve package in line.

SUMMARY OF THE INVENTION

Exemplary embodiments of the present invention are directed to a method associated with a valve controller configured to capture dynamic process conditions. In an exemplary embodiment, a knowledge based control method is associated with a valve package having a process valve, an actuator and a controller. The method includes obtaining a baseline signature corresponding to at least one operating characteristic value of the valve as the valve moves from an open position to a closed position and from a closed position to an open position in-line as process media is flowing through the valve. The baseline signature is stored in a memory. An operating signature is obtained corresponding to values associated with said baseline signature each time the valve moves from either an open position to a closed position or from a closed position to an open position in-line as process media is flowing through the valve. The operating signature is compared to the baseline signature. A determination is made if one or more of the values associated with the operating signature is within an acceptable tolerance deviation from the baseline signature. If the one or more values of the operating signature falls outside of the acceptable tolerance deviation, an alarm notification is triggered.

BRIEF DESCRIPTIONS OF THE DRAWINGS

DESCRIPTION OF EMBODIMENTS

Figure 1:
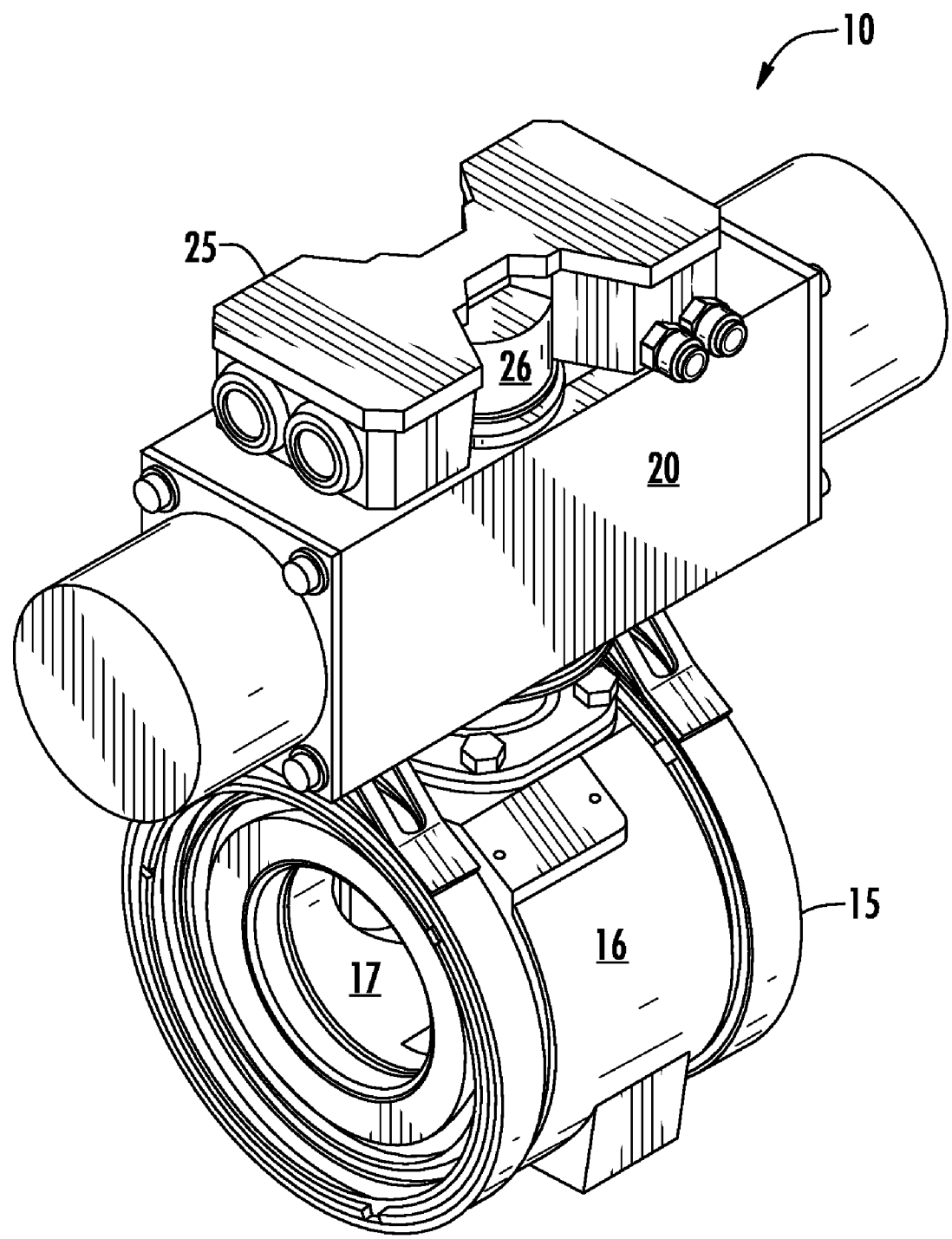
FIG. 1 is an exemplary embodiment of a valve package.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

As explained above and as shown in FIG. 1, a valve package 10 typically includes a process valve 15, actuator 20 and controller 25. Process valve 15 is installed along the longitudinal axis within a process pipeline (not shown) to allow, restrict or prevent process media flowing through the valve. Valve 15 includes a housing 16 through which a flow passage 17 is disposed to allow process media to flow through the valve. Actuator 20 is mounted on valve 15 and is typically pneumatically actuated, but may also be electric or hydraulic. Actuator 20 includes an output shaft that is connected to the valve stem. The output shaft either rotates or lifts upward (depending on the valve type) to provide the necessary torque to turn or lift the valve stem to open or close the valve. Controller 25 is usually mounted on the actuator and is configured to control the actuator based on various input signals. Controller 25 may also include a visual indicator 26 to display the position of valve 15. The time it takes the valve to open and close will depend on the type and size of the valve, the torque rating of the actuator, the process media flowing through the valve and the desired operating parameters. These dynamics of the valve package may be different when installed with process flowing through the system as compared to a standard or "bench" signature of the valve package. For example, a valve 15 having a particular size may be configured with an actuator 20 appropriate for opening and closing the subject valve. However, the torque required from actuator 20 to open valve 15 with no process flowing may be less than that required when process is flowing through the valve. Thus, an open and close signature illustrating the time and pressure required to open and/or close valve 15 may be different in-line vs. out of line (or on a bench).

Figure 2:
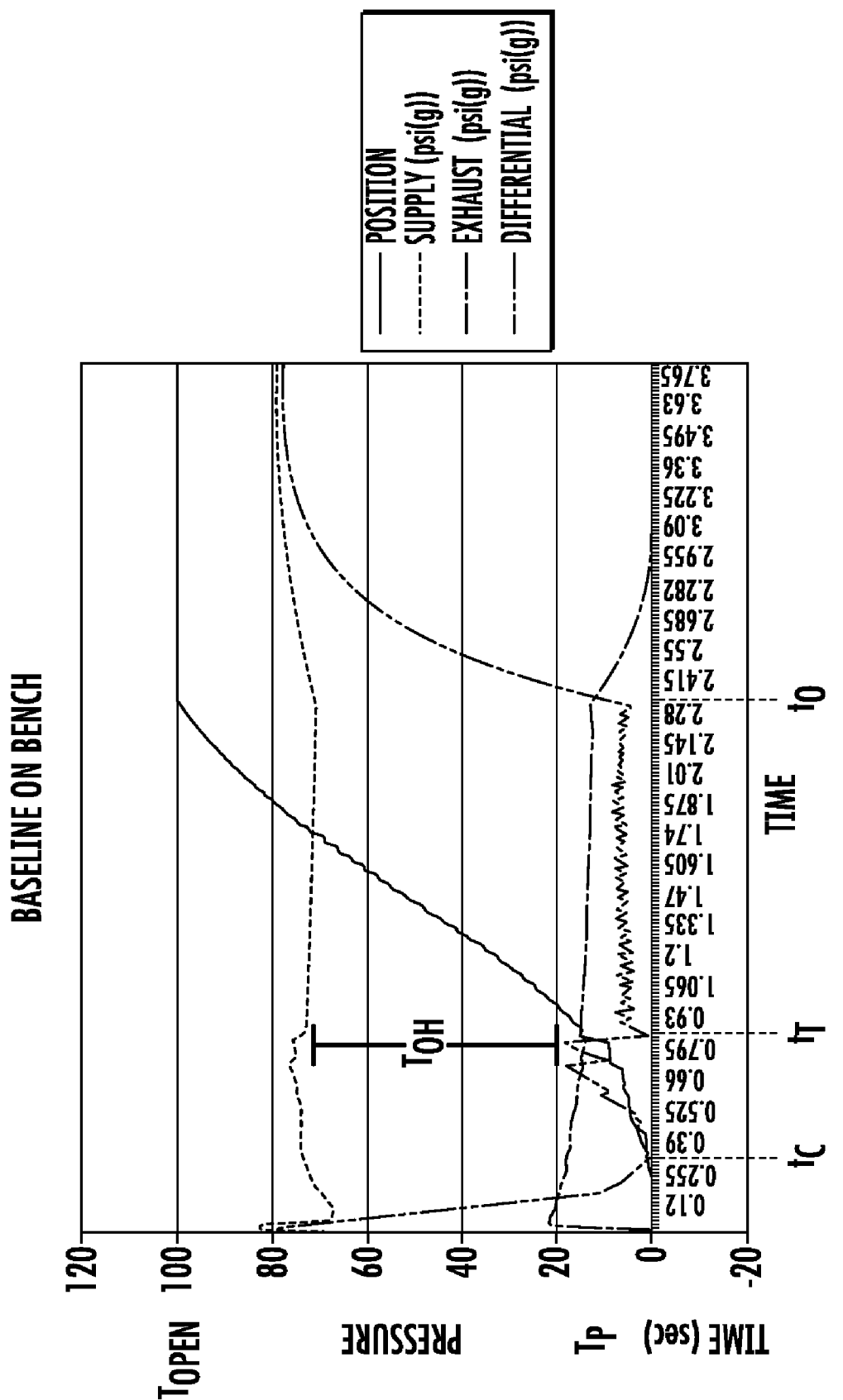
FIG. 2 is a baseline signature of the operation of a valve package.

FIG. 2 illustrates an exemplary baseline signature of pressure vs. time for a valve package not installed within a process line. The profile includes torque differential profile T, supply pressure profile S, valve position profile P, and exhaust profile E. Supply pressure is the amount of pressure supplied to the actuator. Exhaust pressure is the amount of pressure exiting the actuator. Position indicates whether the valve is open, closed or somewhere in between as well as the time it takes to reach such a position. Differential pressure is the pressure to and from the actuator and provides information about the peak torque values. Peak torque relates to the amount of torque required when breaking the seal of the valve from its seat when opening the valve and when sufficiently engaging the seat of the valve when the valve is to be closed.

The torque profile associated with a valve package indicates that the valve is sized correctly if the profile falls within a predetermined safety margin. In addition, the torque profile identifies the shear values associated with the particular valve and actuator shaft. For example, if the torque thrust associated with a particular torque profile is too high, this may indicate that the valve seal is corroding which may cause the shaft to stall during operation. If the torque is low or decreasing, this may indicate that the actuator is too large for the application imparting too much torque on the valve shaft which may eventually cause the shaft to snap. Thus, a baseline is used as a reference to compare operation of the valve assembly to determine degradation of the assembly within a process system.

The valve position profile P illustrates that the valve is in a closed position at time $t_c$ and begins to open (based on a received command to the controller) at about 0.255 sec. As the actuator begins to open the valve, torque T begins to build as the valve is removed from its seat referred to as the peak torque $T_p$ which, in this example, is about 17 psi (g). The open supply pressure profile S decreases slightly at time $t_T$ at around 75 psi (g) when the valve breaks away from its seat. Once the valve seal is broken from the seat, the torque required to continue moving the valve to a full open position drops at around 0.795 sec and continues relatively constant until the valve is fully open at time $t_o$ (about 2.28 sec). The torque builds again as the valve remains in its open position at pressure $T_{open}$. The exhaust is at its highest when the valve is commanded to open but is still in its closed position and decreases during the opening process as most of the supply pressure is used to increase the torque to open the valve. The exhaust profile E decreases again as the valve reaches its open position at time $t_o$. The torque overhead indicated by reference $T_{OH}$, represents the additional torque available from the actuator associated with this particular valve package which is a combination of the size of the valve vs. the size of the actuator when a baseline is taken on the bench.

Figure 3:
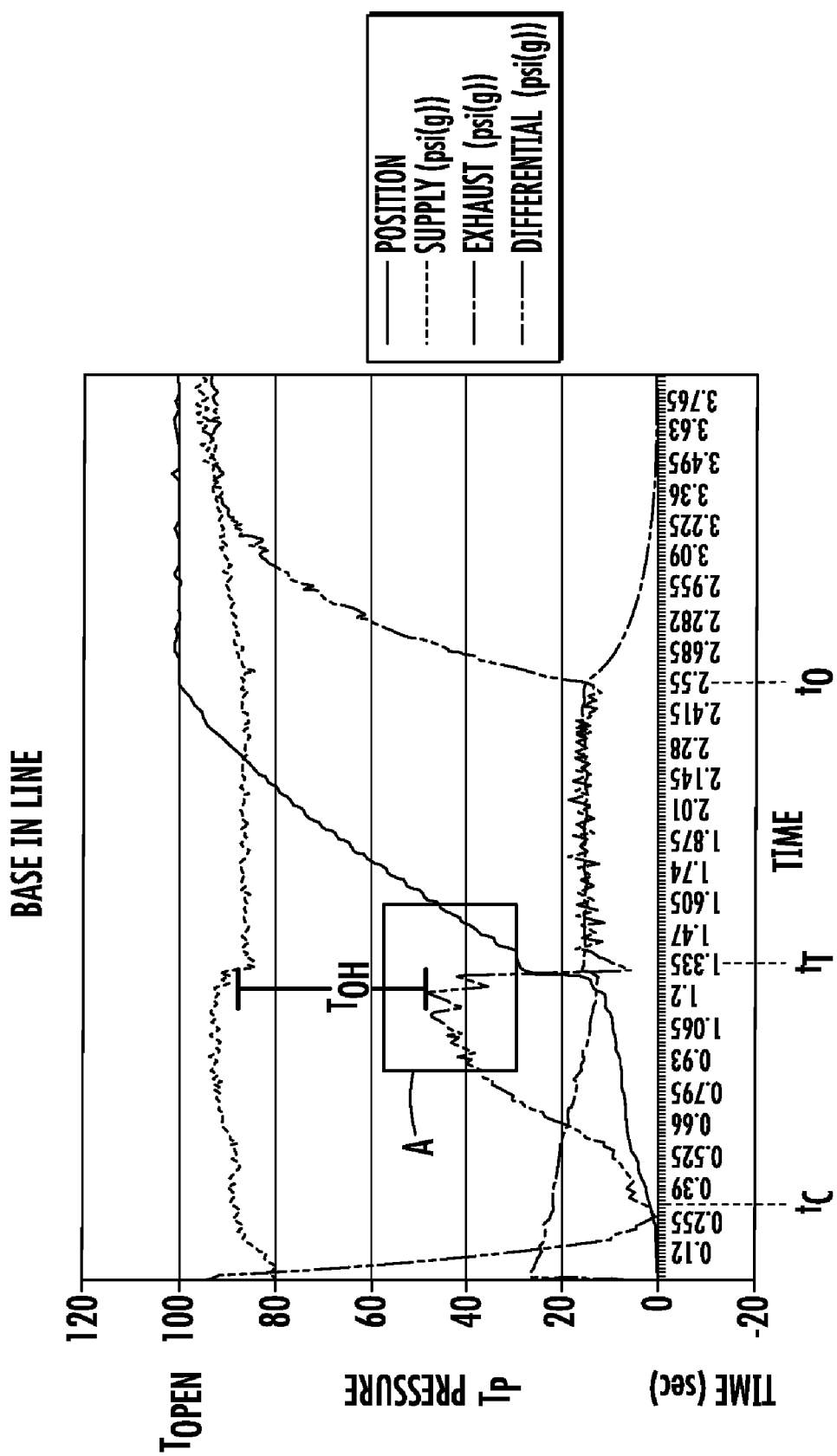
FIG. 3 is a baseline signature of the operation of a valve package taken in-line with process flow in accordance with the present invention.

FIG. 3 illustrates an exemplary baseline signature associated with a valve package in accordance with the present invention. The baseline signature represents the operation of the valve package shown in FIG. 2, but after the package is installed in-line with process flowing through the valve. The valve position profile P illustrates that the valve is in a closed position at time $t_c$ and begins to open (based on a received command to the controller) at about 0.255 sec. The differential torque profile T indicates that the torque begins to build as the valve opens from about 0.255 sec to about 1.3 sec $t_T$. The valve is removed from its seat at the peak torque $T_p$ at about 48 psi (g). The open supply pressure profile S decreases slightly at time $t_T$ at around 85 psi (g) when the valve breaks away from its seat. Once the valve seal is broken from the seat, the torque required to continue moving the valve to a full open position drops at around 1.335 sec and continues relatively constant until the valve is fully open at time $t_o$ (about 2.55 sec). The torque builds again as the valve remains in its open position at pressure $T_{open}$. The exhaust is at its highest when the valve is commanded to open but is still in its closed position and decreases during the opening process as most of the supply pressure is used to increase the torque to open the valve. The exhaust profile E decreases again as the valve reaches its open position at time $t_o$.

The differences between the baseline signature taken from a valve package out of line (FIG. 2) and the baseline signature taken from a valve package taken in-line (FIG. 3) can be seen, for example, by the differences in peak torque $T_p$ (17 psi (g) vs. 48 psi (g)) and the time it takes for the valve to reach its fully open position $t_o$ (2.28 sec vs. 2.55 sec). The torque overhead $T_{OH}$ is also less in-line (FIG. 3) than the torque overhead $T_{OH}$ from the baseline in FIG. 2. In other words, it took a greater amount of torque to break the valve away from its seat when measured in-line vs. when the baseline was taken on the bench. Thus, when the baseline signature is taken in-line, the effects of process flowing through the valve package significantly alter the parameters of the reference signatures. Each time the valve strokes (either partial or full) a signature is created which is compared to the dynamic baseline signature to determine if the valve package is within known operating tolerances. The number of operating signatures stored in memory may vary by application. For example, operating signatures may be stored in memory based on a first in first out process depending on the type of application and memory size. However, if a particular operating signature triggers an alarm, that signature is locked in memory with a date and time stamp and treated by the user accordingly.

The peak torque value $T_p$ which in this case is approximately half the maximum pressure, is also used to identify operational variations for alarm purposes. A user may select a deviation zone around $T_p$ referenced as area A in FIG. 3 to determine acceptable parameters during valve operation. In particular, a hysteresis profile may be created around deviation zone A which is used as a basis to trigger alarm activity. In this manner, alarms may be triggered when the differential pressure changes outside of area A to indicate degradation of the valve package. For example, if the pressure required to break the seal when opening the valve increases outside deviation zone A, an alarm may sound alerting the user to possible operation failure. If the pressure required to break the seal when opening the valve decreases which falls outside deviation zone A, an alarm may sound alerting the user to possible operation failure. The percent deviation from $T_p$ is user defined and based on the type of valve employed and process media used.

A dynamic baseline signature may be developed after N operating valve cycles. This may be done to capture process dynamics in-line after a defined Break-In period (cycle count) for a new valve assembly. A rolling average of the supply pressure taken from installation through the $N^{th}$ cycle is used to determine the Nominal Supply Pressure. Any alarms referenced above may be prohibited from triggering until after the Nth cycle to accommodate changes in operating characteristics of the valve package within the process environment during Break-In. By utilizing a baseline signature associated with a valve package taken in-line, a more accurate reference signature is captured. This leads to better monitoring of the valve package which avoids unnecessary maintenance costs and process interruptions. In addition, operation signatures may be used as a diagnostic tool to determine valve and actuator sizing and operation degradation.

Both the baseline and operating signatures for each of the parameters (e.g., supply pressure, differential pressure, exhaust pressure and position) are determined by a particular data scan rate in order to provide a graphical representation of the operation of the valve. When a valve $V_1$ undergoes a stroke from closed to an open position, it may take time $t_1$ to complete the stroke. This time $t_1$ is dependent on a number of variables including the size of valve $V_1$, the size of the actuator and the process media flowing through. However, a smaller valve $V_2$ and actuator package may take time $t_2$ to complete a full stroke where $t_1 > t_2$. Thus, in order to obtain an accurate signature of the position of each valve, the scan rate for valve $V_2$ must be greater than the scan rate for valve $V_1$ because valve $V_2$ takes less time to complete a stroke. Thus, the method in accordance with the present invention utilizes a look-up table to determine the sampling rates for a particular valve package based on the time it takes for the valve to complete a stroke during calibration. This is done while the valve is in-line. For example, if it takes 10 sec for a valve to open, the sampling rate for data collection may be every 50 msec. In addition, the sampling rate may be different where it takes the valve different times to open vs. close. Thus, one sampling rate may be associated with an open stroke and a different sampling rate may be associated with a close stroke for the same valve. In this manner, a method is utilized to capture dynamic reference characteristics of a valve package in-line with process flowing through the valve.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A knowledge based control method associated with a valve package having a process valve, an actuator and a controller, the method comprising:
    obtaining a baseline signature for said valve corresponding to an operating characteristic value of said valve as the valve moves from a first position to a second position in-line as process media is flowing through the valve, the baseline signature comprising a torque profile for the valve;
    storing said baseline signature in a memory;
    obtaining an operating signature for said valve corresponding to values associated with said baseline signature each time the valve moves from said first position to said second position in-line as process media is flowing through the valve;
    comparing said operating signature to the baseline signature; and
    determining if one or more of the values associated with the operating signature is within an acceptable tolerance deviation from the corresponding one or more values in the baseline signature;
    wherein said baseline signature is calculated from a rolling average of said operating characteristic determined only after a defined break-in period, the break-in period defined by a period of N cycles, wherein a cycle is defined as movement of the valve from said first position to said second position and from said second position to said first position where N>1.

2. The method of claim 1 wherein said step of obtaining a baseline signature further comprises obtaining said baseline signature as the valve moves from said first position to said second position and back to the first position in-line as process media is flowing through the valve.

3. The method of claim 1 wherein said step of obtaining an operating signature further comprises obtaining said operating signature each time the valve moves from said first position to said second position and back to the first position in-line as process media is flowing through the valve.

4. The method of claim 1 further comprising triggering an alarm notification when a peak torque value for the valve falls outside of said acceptable tolerance deviation.

5. The method of claim 1 wherein said operating characteristic is at least one of the valve's position, torque, supply pressure and exhaust pressure.

6. The method of claim 1 wherein said first position corresponds to an open position of said valve, and said second position corresponds to a closed position of said valve, and any alarms based on said comparing said operating signature to said baseline signature are prohibited from triggering until after the Nth cycle.

7. The method of claim 6 wherein said data scan rate is based on the size of said valve, a torque value associated with said actuator and process media flowing through said valve.

8. The method of claim 1 wherein said baseline signature values are obtained based on a particular data scan rate during a valve cycle wherein a stroke is defined as movement of the valve from said first position to said second position.

9. The method of claim 1 wherein said first position is a closed position and said second position is an open position, said baseline signature values are obtained based on a first data scan rate when said valve moves from an open to a closed position, and a second data scan rate when said valve moves from a closed position to an open position.

10. The method of claim 9 wherein said first data scan rate is equal to said second data scan rate.

11. The method of claim 9 wherein said first data scan rate is not equal to said second data scan rate.

12. The method of claim 1 wherein the operating signature is stored in a memory.

13. The method of claim 12 further comprising storing a plurality of said operating signatures taken over a predetermined time interval in said memory.

14. The method of claim 1 wherein said at least one operating characteristic value of said valve is a peak torque value associated with the amount of torque required to be supplied by said actuator to open the valve from a closed position.

15. The method of claim 14 where said at least one of an operating characteristic is torque overhead defined as the differential between said peak torque value and said supply pressure.

16. The method of claim 14 wherein a deviation zone is associated with the peak torque value required to open the valve, said method triggering an alarm when a torque value associated with the operating signature falls outside the deviation zone.

17. A valve system comprising:
    a process valve connected to a pipe line through which process media travels;
    an actuator mounted on said valve and configured to open and close said valve; and
    a controller connected to said actuator and configured to supply signals to said actuator to open or close said valve, said controller further configured to obtain a baseline signature for said valve corresponding to at least one operating characteristic value of said valve as the valve moves from said open position to said closed position and from said closed position to said open position in-line as process media travels through said valve, the baseline signature comprising a torque profile for the valve,
    said controller further comprising a memory device for storing said baseline signature, said controller further configured to obtain an operating signature for said valve corresponding to values associated with said baseline signature each time the valve moves from the open position to the closed position and from the closed position to the open position, said controller comparing said operating signature to said baseline signature;

wherein said baseline signature is calculated from a rolling average of said operating characteristic determined only after a defined break-in period, the break-in period defined by a period of N cycles wherein a cycle is defined as movement of the valve from said open position to said closed position and from closed position to said open position, where N>1.

18. The valve system of claim 17, wherein any alarms based on said comparing said operating signature to said baseline signature are prohibited from triggering until after the Nth cycle.

19. The valve system of claim 17, wherein said baseline signature value is obtained based on a first data scan rate when said valve moves from said open to said closed position, and a second data scan rate when said valve moves from said closed position to said open position.

20. The valve system of claim 17, wherein said first data scan rate and said second data scan rate are determined from a look-up table based on a time it takes for the valve to complete a stroke during calibration.

\* \* \* \* \*